J. HANKEY.
CURRIER'S SCOURER.
No. 52,491. Patented Feb. 6, 1866.
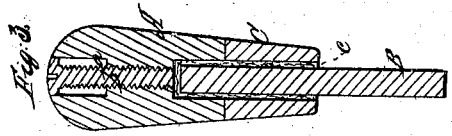
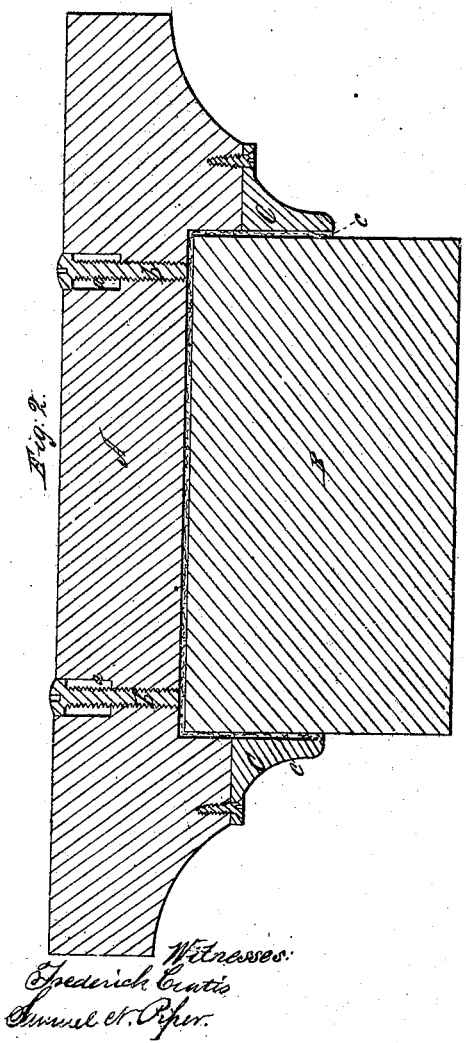
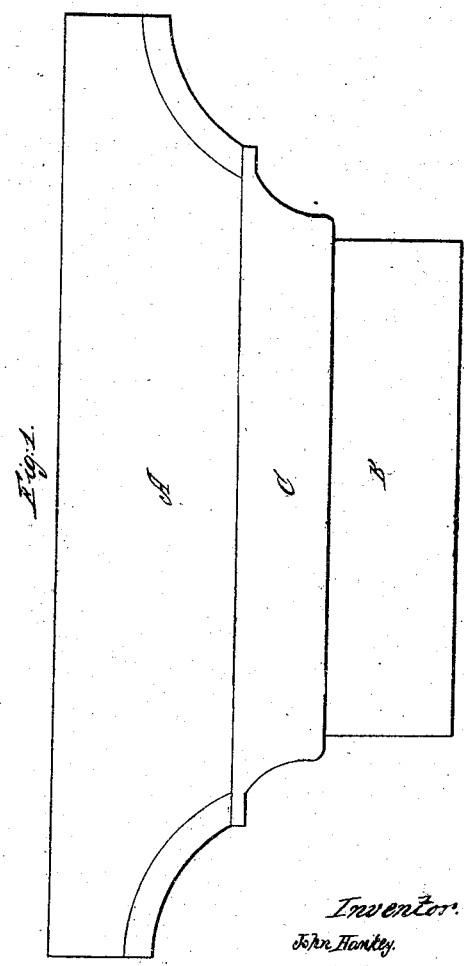

UNITED STATES PATENT OFFICE.

JOHN HANKEY, OF NORTH CAMBRIDGE, MASSACHUSETTS, ASSIGNOR TO HIMSELF AND HENRY MULLER, OF SAME PLACE.

IMPROVED CURRIER'S SCOURER.

Specification forming part of Letters Patent No. 52,491, dated February 6, 1866.

*To all whom it may concern:*

Be it known that I, JOHN HANKEY, of North Cambridge, in the county of Middlesex and State of Massachusetts, have invented an Improved Currier's Scourer; and I do hereby declare the same to be fully described in the following specification and represented in the accompanying drawings, of which—

Figure 1 denotes a side view, Fig. 2 a longitudinal section, and Fig. 3 a transverse section, of it.

The common currier's scourer in use consists simply of a piece of stone and a wooden handle for holding it, the stone being fixed in and so as to project from the handle. When so made the handle is very liable to become split or broken and the stone to drop out of it; and, besides, it affords no ready means of adjusting the stone or projecting it more or less beyond the handle in proportion as the stone may become worn, or as may be necessary from time to time.

In carrying out my invention I combine with the stone and the wooden handle a metallic socket-piece fastened to the handle and provided with a recess to receive the stone, and I also provide the handle with certain adjusting-screws and recesses for reception of their heads and to allow them to enter the handle as the screws may be driven forward therein from time to time, in order to move the stone in the socket.

In the drawings, A denotes the wooden handle, B the scouring-stone, and C the metallic socket-piece. The said socket-piece is screwed or otherwise fastened to the handle, and is made with a socket or recess, c, to receive the stone, which may be held therein by packing or wedges, or other suitable means, and so as to project from the socket-piece in manner as represented.

Two cylindrical holes, a a, are bored in the handle A, so as to extend into it about one-half its depth, they being large enough to receive the heads of the screws b b, which are screwed into the handle and against the inner edge of the stone, the whole being as shown in Fig. 2.

When the scourer is made in the improved manner described the stone may be used with any amount of pressure on the hide or skin without danger of breaking the handle, and also may be set out from the socket-piece by the screws, as circumstances may require, as it may become more or less worn.

I claim—

The improved currier's scourer as made with the metallic socket-piece, combined and arranged with the handle and the stone, and with the said handle provided with the adjusting-screws and the recesses for reception of their heads, substantially as described.

JOHN HANKEY.

Witnesses:
R. H. EDDY,
F. P. HALE, Jr.